United States Patent
Ohmori et al.

(10) Patent No.: US 8,481,226 B2
(45) Date of Patent: Jul. 9, 2013

(54) SHEET BODY OF SOLID OXIDE FUEL CELL, AND SOLID OXIDE FUEL CELL

(75) Inventors: Makoto Ohmori, Nagoya (JP); Natsumi Shimogawa, Nagoya (JP); Shigeki Okada, Nishio (JP); Tsutomu Nanataki, Toyoake (JP)

(73) Assignee: NGK Insulators, Ltd., Nagoya (JP)

( * ) Notice: Subject to any disclaimer, the term of this patent is extended or adjusted under 35 U.S.C. 154(b) by 617 days.

(21) Appl. No.: 12/538,324

(22) Filed: Aug. 10, 2009

(65) Prior Publication Data
US 2010/0047651 A1 Feb. 25, 2010

(30) Foreign Application Priority Data

Aug. 21, 2008 (JP) .................... 2008-212410
May 14, 2009 (JP) .................... 2009-117570

(51) Int. Cl.
*H01M 4/86* (2006.01)
*H01M 8/12* (2006.01)

(52) U.S. Cl.
USPC .................... 429/488; 429/479; 429/484

(58) Field of Classification Search
USPC ................................ 429/479–489
See application file for complete search history.

(56) References Cited

U.S. PATENT DOCUMENTS

| | | | |
|---|---|---|---|
| 5,141,825 A | * | 8/1992 | Jensen .................... 429/535 |
| 6,589,680 B1 | | 7/2003 | Gorte et al. |
| 6,844,099 B1 | | 1/2005 | Gorte et al. |
| 2001/0029231 A1 | | 10/2001 | Gorte et al. |
| 2001/0053471 A1 | | 12/2001 | Gorte et al. |
| 2003/0211381 A1 | | 11/2003 | Gorte et al. |
| 2007/0248869 A1 | | 10/2007 | Ohmori et al. |
| 2008/0096076 A1 | | 4/2008 | Ohmori et al. |

FOREIGN PATENT DOCUMENTS

| | | |
|---|---|---|
| EP | 1 858 106 A2 | 11/2007 |
| EP | 1 919 021 A2 | 5/2008 |
| JP | 05-251095 | 9/1993 |
| JP | 10172578 * | 6/1998 |
| JP | 10-228911 | 8/1998 |
| JP | 2006-139966 | 6/2006 |
| JP | 2007-012498 | 1/2007 |
| WO | 00/52780 | 9/2000 |

OTHER PUBLICATIONS

Machine Translation of JP 10172578 (Jun. 1998).*

* cited by examiner

*Primary Examiner* — Jonathan Crepeau
*Assistant Examiner* — Jacob Buchanan
(74) *Attorney, Agent, or Firm* — Burr & Brown

(57) ABSTRACT

A sheet body includes an electrolyte layer, a fuel electrode layer formed on the upper surface of the electrolyte layer, and an air electrode layer formed on the lower surface of the electrolyte layer, wherein these layers are stacked and fired in such a manner that the electrolyte layer is sandwiched between the fuel electrode layer and the air electrode layer. The fuel electrode layer is a porous layer including a first layer on a side close to the electrolyte layer made of fine particles of Ni and YSZ, and a second layer on a side apart from the electrolyte layer made of fine particles of Ni, YSZ, and $ZrSiO_4$. The zircon particles are uniformly distributed in the second layer in the plane direction and in the stacking direction.

5 Claims, 9 Drawing Sheets

SHEET BODY OF SOLID OXIDE FUEL CELL, AND SOLID OXIDE FUEL CELL

FIELD OF THE INVENTION

The present invention relates to a solid oxide fuel cell (SOFC), and particularly to a sheet body (may also be referred to as "a single cell") used in the SOFC.

DESCRIPTION OF THE RELATED ART

There has conventionally been known a sheet body for a single cell of the SOFC (refer to, for example, Japanese Patent Application Laid-Open (kokai) No. 2006-139966). The sheet body includes a solid electrolyte layer, a fuel electrode layer formed on the upper surface of the solid electrolyte layer for receiving a supply of a fuel cell (e.g., hydrogen) from its top surface, and an air electrode layer formed on the lower surface of the solid electrolyte layer for receiving a supply of a gas (e.g., air) containing oxygen from its lower surface, wherein these layers are laminated and fired.

BACKGROUND OF THE INVENTION

In the sheet body described above, the thermal expansion coefficient of the fuel electrode layer made of Ni—YSZ cermet is generally larger than the thermal expansion coefficient of the solid electrolyte layer made of YSZ. Accordingly, the fired sheet body is likely to be deformed due to the internal stress (thermal stress) caused by the difference in the thermal expansion coefficient between the layers. The sheet body may also be deformed due to the internal stress (thermal stress) that is caused by the difference in the amount of expansion and contraction between the layers upon the firing. The sheet body is generally deformed in a direction in which the side of the air electrode layer projects (a direction in which the lower side projects).

Meanwhile, an attempt has been made to form the sheet body as thinner as possible in order to attain the miniaturization of the SOFC and reduction in the internal electrical resistance. When the sheet body is formed to be extremely thin, the support body (the layer supporting the sheet body, e.g., the fuel electrode layer) in the sheet body becomes thin, with the result that the deformation of the sheet body described above can be noticeable.

In this case, various problems arise. For example, a fuel gas channel or an air channel formed at the portion opposite to the upper surface of the fuel electrode layer or the lower surface of the air electrode layer is extremely thin. Therefore, the deformed sheet body might close these channels. Even if the sheet body is deformed to such a degree that it does not close the channels, the pressure loss generated when the fluid such as air or fuel gas flows through the channels might increase due to the deformation of the sheet body.

In order to reduce the deformation (warpage) of the sheet body, it is considered that, for example, a material having a small thermal expansion coefficient is contained in the fuel electrode layer for reducing the mean thermal expansion coefficient of the fuel electrode layer, by which the thermal expansion coefficient is made close to the thermal expansion coefficient of the solid electrolyte layer. However, when the material contained in the fuel electrode layer is an insulator, a problem might newly arise that the electrical resistance in the stacking direction of the fuel electrode layer extremely increases according to the additive amount or adding manner of the insulator.

SUMMARY OF THE INVENTION

Thus, an object of the present invention is to provide an extremely thin sheet body for a single cell of the SOFC, in which warpage can be suppressed, and the increase in the electrical resistance of the fuel electrode layer can also be suppressed.

In order to attain the foregoing object, a sheet body for a solid oxide fuel cell according to the present invention is a fired laminate of a solid electrolyte layer; a fuel electrode layer formed on an upper surface of the solid electrolyte layer (and having a thermal expansion coefficient greater than that of the solid electrolyte layer), and receiving a supply of a fuel gas from the upper surface of the fuel electrode layer; and an air electrode layer formed on a lower surface of the solid electrolyte layer and receiving a supply of a gas containing oxygen from the lower surface thereof.

The sheet body for a solid oxide fuel cell according to the present invention is characterized in that the fuel electrode layer includes at least particles of a first material for allowing an oxygen ion to pass, particles of a second material for allowing an electron to pass, and particles of zircon, wherein the zircon particles are uniformly distributed in the plane direction of the fuel electrode layer (in other words, the distribution state (the state of presence) of the zircon particles is homogenous in the plane direction of the fuel electrode layer). It is further preferable that, in the fuel electrode layer, the contained amount of the zircon particles per unit volume is greater at the side apart from the solid electrolyte layer in the stacking direction of the fuel electrode layer than at the side close to the solid electrolyte layer. Here, the "first material for allowing an oxygen ion to pass" is, for example, zirconia, and the "second material for allowing an electron to pass" is, for example, nickel.

Zircon has a thermal expansion coefficient that is much smaller than that of zirconia. Therefore, when the zircon particles are contained in the fuel electrode layer as described above, the mean thermal expansion coefficient of the fuel electrode layer is reduced to be made close to the thermal expansion coefficient of the solid electrolyte layer. Thus, the warpage of the sheet body (the warpage in which the lower side projects) caused by the difference in the thermal expansion coefficient between the layers can be suppressed. Additionally, when the contained amount of the zircon particles per unit volume at the side apart from the solid electrolyte layer is larger in the fuel electrode layer (accordingly, the local thermal expansion coefficient is small), internal stress (thermal stress) is generated in the direction in which the side apart from the solid electrolyte layer projects (in the direction in which the upper side projects) in the single body of the fuel electrode layer. By virtue of this, the warpage of the sheet body (the warpage in the direction in which the lower side projects) can more be suppressed.

However, if the zircon particles are non-uniformly distributed in the plane direction of the fuel electrode layer, the electrical resistance in the stacking direction becomes extremely great at the region where the zircon particles are dense, since zircon is an insulator from the viewpoint of electronic conduction. When the area where the electrical resistance is extremely great is produced in the stacking direction, the electrical resistance of the whole sheet body increases, and further, a problem might arise in which the area is heated to a high temperature due to a Joule heat generated upon the electrical generation so as to damage the sheet body. On the other hand, when the zircon particles are uniformly distributed in the plane direction of the fuel electrode layer, an area where the electrical resistance increases extremely is not produced in the stacking direction. Consequently, the average increase in the electrical resistance in the stacking direction of the fuel electrode layer can be prevented.

The present invention can provide an extremely thin sheet body for a single cell of the SOFC in which the warpage can be suppressed and the increase in the electrical resistance of the fuel electrode layer can also be prevented. Further, the effects described below can be provided by containing zircon in the fuel electrode layer.

1. The zircon has a property of not reacting with the first and the second materials (e.g., NiO, YSZ, etc.) constituting the fuel electrode layer. Therefore, the alteration of the first and the second materials in the fuel electrode layer can be prevented.
2. The Young's modulus of the zircon is extremely great such as about 300 GPa. Therefore, when the fuel electrode layer serves as a support layer of the sheet body, the rigidity of the fuel electrode layer serving as the support layer can be increased, which is advantageous in making the sheet body flat and thin.
3. It is necessary to perform a predetermined reduction process to the fuel electrode layer in order to make the fuel electrode layer serve as a fuel electrode. The zircon can contribute to the maintenance of the shape of the fuel electrode layer upon the reduction process. Specifically, the fuel electrode layer contracts due to the reduction process. When the sheet body is extremely thin, the sheet body warps because of the contraction of the fuel electrode layer. When the fuel electrode layer contains zircon, the warpage of the sheet body can be prevented.

When the SOFC is used, the grain growth (sintering) of the second material (Ni, etc.) in the fuel electrode layer after the reduction process may be produced. Due to the grain growth, the conduction path (specifically, the path through which electrons pass) connected and formed due to the contact of the second materials (Ni, etc.) in the fuel electrode layer changes, whereby the conductivity of the fuel electrode layer is generally lowered. When the fuel electrode layer contains zircon, the grain growth can be prevented. Specifically, the reduction in the conductivity of the fuel electrode layer caused by the grain growth can be prevented.

5. The zircon itself does not become a poisoning source of the fuel electrode layer during when the SOFC is used.

The sheet body according to the present invention can be configured such that the fuel electrode layer is a laminate of a first layer formed on the upper surface of the solid electrolyte layer and composed of the particles of the first and second materials, and a second layer formed on the upper surface of the first layer and composed of the particles of the first and second materials and the zircon particles, wherein the zircon particles are uniformly distributed in the plane direction and stacking direction.

The fuel electrode layer having two layers described above can easily be manufactured by the method in which, for example, green sheets (tapes) that are to become the first and second layers is prepared, and these sheets are laminated and fired. According to this method, the fuel electrode layer having two layers in which "the zircon particles are uniformly distributed in the plane direction of the fuel electrode layer, and the contained amount of the zircon particles per unit volume is greater at the side of the fuel electrode layer apart from the solid electrolyte layer in the stacking direction than at the side thereof close to the solid electrolyte layer" can easily be manufactured.

In the sheet body according to the present invention, it is preferable that the thickness of the solid electrolyte layer is within the range of 0.1 to 30 µm, the thickness of the fuel electrode layer is within the range of 50 to 500 µm, and the thickness of the air electrode layer is within the range of 3 to 50 µm. The ratio of the thickness of the second layer to the thickness of the fuel electrode layer is preferably 5 to 80%.

Further, it is preferable that the thermal expansion coefficient of the solid electrolyte layer is within the range of 10 to 11.5 ppm/K, the thermal expansion coefficient of the air electrode layer is within the range of 10 to 14 ppm/K, the thermal expansion coefficient of the first layer is within the range of 11.5 to 13.0 ppm/k, and the thermal expansion coefficient of the second layer is within the range of 10.5 to 12 ppm/K. It is preferable that the diameter of the particle of the first material contained in the second layer is within the range of 0.3 to 1.5 µm, the diameter of the particle of the second material contained in the second layer is within the range of 0.5 to 2 µm, and the diameter of the zircon particle contained in the second layer is within the range of 0.7 to 2.5 µm. In the second layer, the contained amount of the zircon particles per unit volume is preferably within the range of 3 to 30 vol. %.

A solid oxide fuel cell employing the sheet body according to the present invention includes one or plural sheet bodies having the above-mentioned structure, and plural support members that support the one or plural sheet bodies, wherein the sheet bodies and the support members are stacked in alternating fashion, and for each sheet body, a channel of a fuel gas, which is a fuel channel, is defined between the sheet body and the support member formed above the sheet body so as to be adjacent to the sheet body, while a channel of a gas containing oxygen, which is an air channel, is defined between the sheet body and the support member formed below the sheet body so as to be adjacent to the sheet body.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DETAILED DESCRIPTION OF THE INVENTION

A solid oxide fuel cell according to an embodiment of the present invention will next be described with reference to the drawings.

Figure 1:
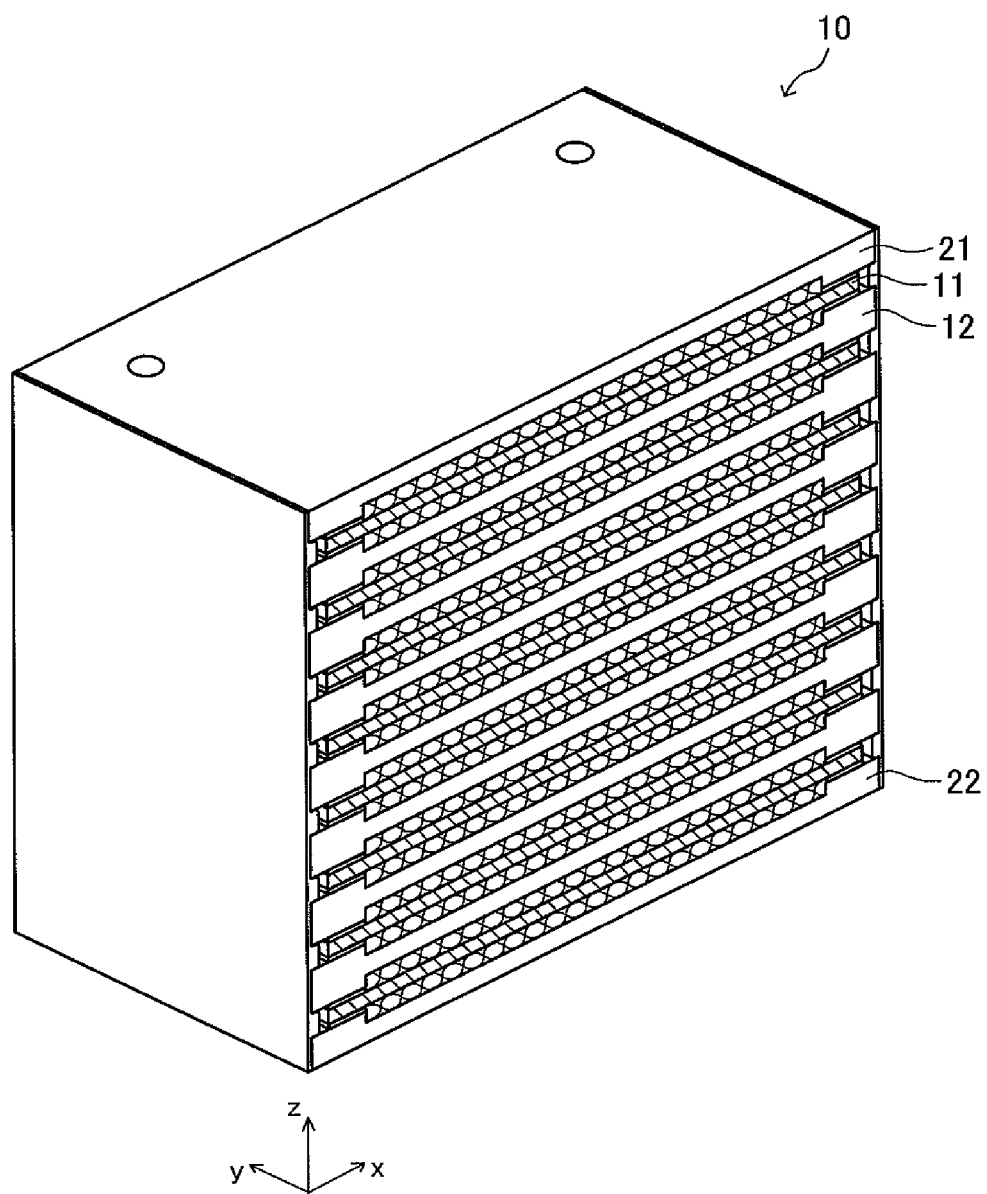
FIG. 1 is a cutaway perspective view of a solid oxide fuel cell according to an embodiment of the present invention.
Figure 2:
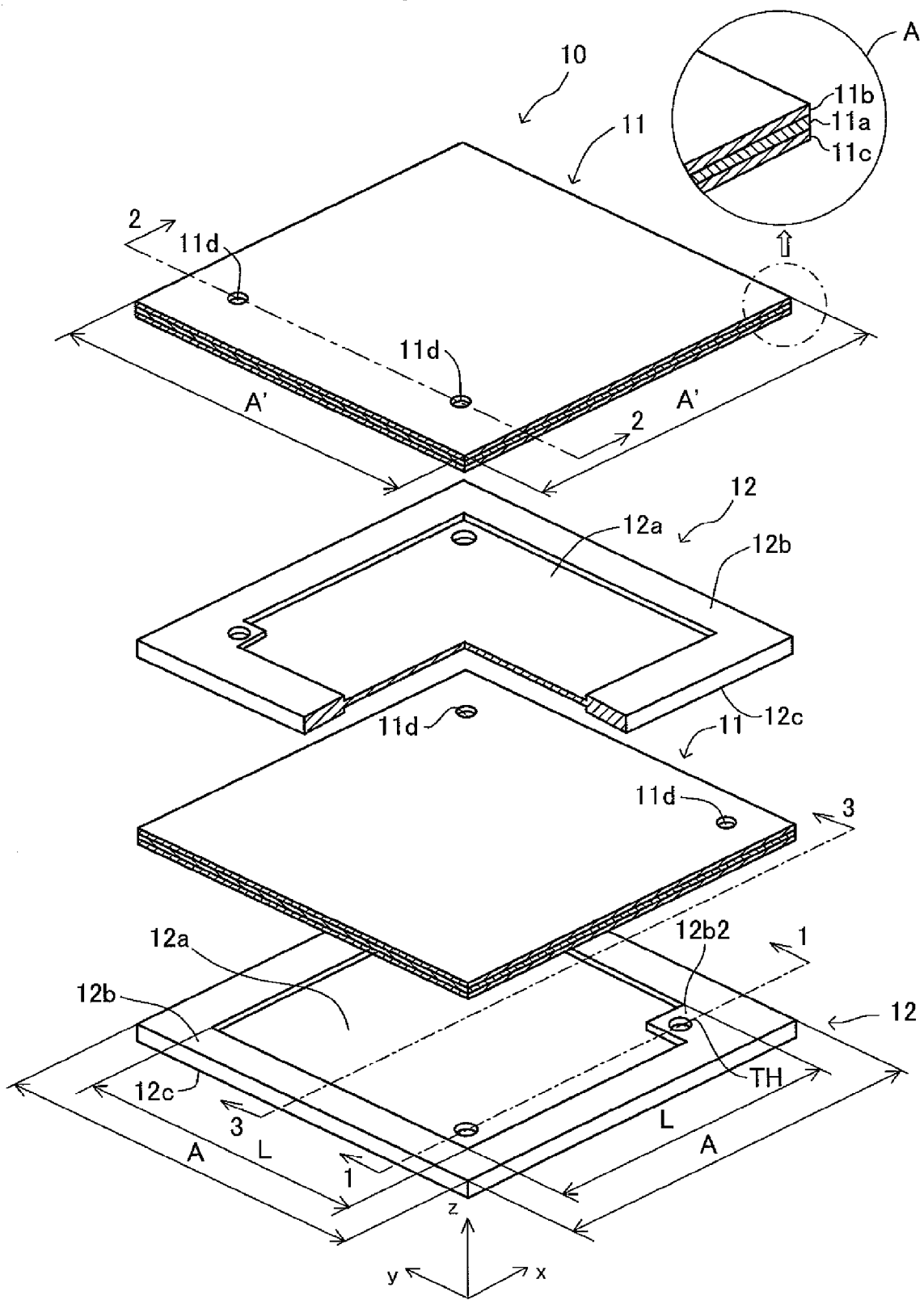
FIG. 2 is an exploded partial perspective view of the fuel cell shown in FIG. 1.

Overall Structure of Fuel Cell:

FIG. 1 perspectively shows, in a cutaway fashion, a solid oxide fuel cell (hereinafter, referred to merely as the "fuel cell") 10, which is a device according to an embodiment of the present invention. FIG. 2 perspectively and partially shows, in an exploded fashion, the fuel cell 10. The fuel cell 10 is configured such that sheet bodies 11 and separators (support members) 12 are stacked in alternating layers. That is, the fuel cell 10 has a flat-plate stack structure.

In the flat-plate stack structure described above, an upper cover member 21 is arranged and fixed above the sheet body 11 positioned at the uppermost part, while a lower cover member 22 is arranged and fixed below the sheet body 11 positioned at the lowermost part. The sheet body 11 is also referred to as a "single cell" of the fuel cell 10.

As shown on an enlarged scale within a circle A of FIG. 2, the sheet body 11 is a fired body having an electrolyte layer (solid electrolyte layer) 11$a$, a fuel electrode layer 11$b$ formed on the upper surface of the electrolyte layer 11$a$, and an air electrode layer 11$c$ formed on the lower surface of the electrolyte layer 11$a$. The planar shape of the sheet body 11 is a square having sides (length of one side=A') extending along mutually orthogonal x- and y-axes. The sheet body 11 is a plate member (thickness=t1) having a thickness along a z-axis orthogonal to the x-axis and the y-axis.

In the present embodiment, the electrolyte layer 11$a$ is a fired body of YSZ (yttria-stabilized zirconia). The fuel electrode layer 11$b$ is a fired body of NiO, YSZ and zircon (Zr-SiO$_4$), and a porous electrode layer (having two layers as described later). The fuel electrode layer 11$b$ becomes Ni—YSZ cermet after the reduction process so as to function as a fuel electrode. The air electrode layer 11$c$ is a fired body of LSCF (La0.6Sr0.4Co0.2Fe0.8O3: lanthanum strontium cobalt ferrite) and a porous electrode layer. A reaction preventing layer such as ceria (CeO$_2$) may be provided between the air electrode layer 11$c$ and the electrolyte layer 11$a$. Examples of the ceria include GDC (gadolinium-doped ceria), SDC (samarium-doped ceria), etc.

The sheet body 11 has a pair of cell through-holes 11$d$. Each of the cell through-holes 11$d$ extends through the electrolyte layer 11$a$, the fuel electrode layer 11$b$, and the air electrode layer 11$c$. The paired cell through-holes 11$d$ are formed in the vicinity of one side of the sheet body 11 and in the vicinity of corresponding opposite ends of the side. The shape or the like of the sheet body 11 will be described in detail later.

Figure 3:
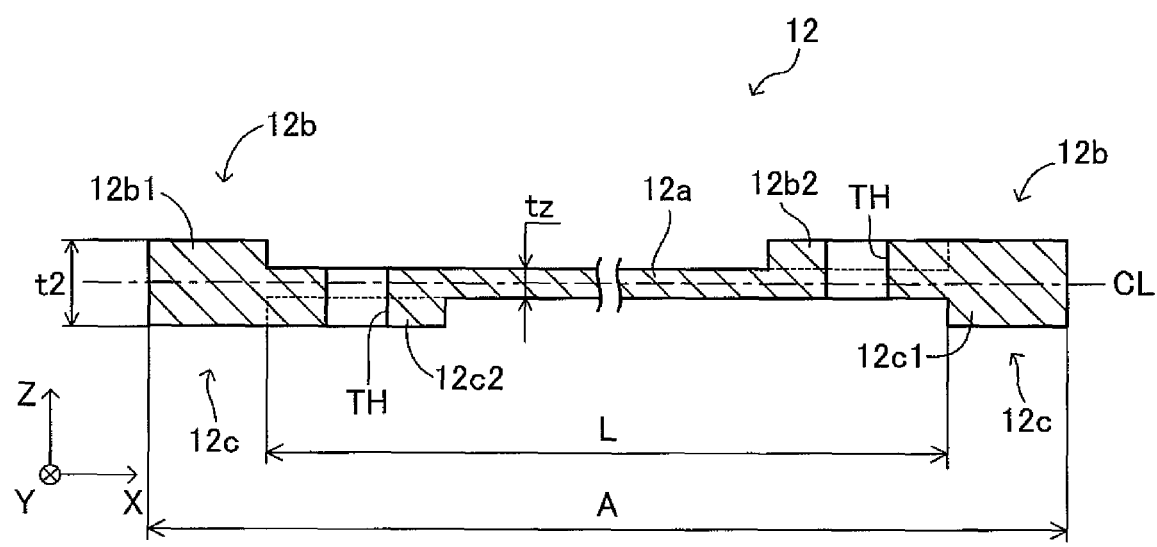
FIG. 3 is a sectional view of a separator taken along a plane that includes line 1-1 of FIG. 2 and is in parallel with an x-z plane.

FIG. 3 is a sectional view of the separator 12 taken along a plane that includes line 1-1 of FIG. 2 parallel with the x-axis and is in parallel with the x-z plane. As shown in FIGS. 2 and 3, the separator 12 includes a plane portion 12$a$, an upper frame portion 12$b$, and a lower frame portion 12$c$. The upper frame portion 12$b$ and the lower frame portion 12$c$ constitute the "frame portion of the separator". The planar shape of the separator 12 is a square having sides (length of one side=A, A is slightly larger than A') extending along the mutually orthogonal x- and y-axes. The thickness of the plane portion 12$a$ is tz, and the thickness of the "frame portion" is t2 (>tz).

The length of one side A of the separator 12 is 5 mm or more and 200 mm or less in the present embodiment. The length L of one side of the planar shape (=square) of the plane portion 12$a$ of the separator 12 is 4 mm or more and 190 mm or less in the present embodiment. The thickness t2 of the "frame portion" of the separator 12 is 200 μm or more and 1000 μm or less. The thickness tz of the plane portion 12$a$ of the separator 12 is 50 μm or more and 100 μm or less.

The separator 12 is formed from a Ni-based heat-resistant alloy (e.g., ferrite SUS, INCONEL 600, or HASTELLOY).

The separator 12 formed from, for example, SUS 430, which is a ferrite SUS, has a room-temperature-to-1000° C. mean thermal expansion coefficient of about 12.5 ppm/K. Thus, the thermal expansion coefficient of the separator 12 is higher than the mean thermal expansion coefficient of the sheet body 11 (described later). Therefore, when the temperature of the fuel cell 10 changes, the difference in the amount of expansion and contraction is produced between the sheet body 11 and the separator 12.

The plane portion 12$a$ is a thin, flat body having a thickness along the z-axis. The planar shape of the plane portion 12$a$ is a square having sides (length of one side=L (<A)) extending along the x-axis and the y-axis.

The upper frame portion 12$b$ is a frame body provided around the plane portion 12$a$ (in a region in the vicinity of the four sides of the plane portion 12$a$; i.e., an outer peripheral region of the plane portion 12$a$) in an upwardly projecting condition. The upper frame portion 12$b$ consists of a perimetric frame portion 12$b$1 and a jutting portion 12$b$2.

The perimetric frame portion 12$b$1 is located on a side toward the perimeter of the separator 12. The vertical section of the perimetric frame portion 12$b$1 (e.g., a section of the perimetric frame portion 12$b$1 whose longitudinal direction coincides with the direction of the y-axis, taken along a plane parallel with the x-z plane) assumes a rectangular shape (or a square shape).

The jutting portion 12$b$2 juts toward the center of the separator 12 from the inner peripheral surface of the perimetric frame portion 12$b$1 at one of four corner portions of the plane portion 12$a$. The lower surface of the jutting portion 12$b$2 is integral with the plane portion 12$a$. The shape of the jutting portion 12$b$2 as viewed in plane (viewed from top) is generally square. The upper surface (plane surface) of the jutting portion 12$b$2 is continuous with the upper surface (plane surface) of the perimetric portion 12$b$1 . The jutting portion 12$b$2 has a through-hole TH formed therein. The through-hole TH also extends through a portion of the plane portion 12$a$ that is located under the jutting portion 12$b$2.

The lower frame portion 12$c$ is a frame body provided around the plane portion 12$a$ (in a region in the vicinity of the four sides of the plane portion 12$a$; i.e., an outer peripheral region of the plane portion 12$a$) in a downwardly projecting condition. The lower frame portion 12$c$ is symmetrical with the upper frame portion 12$b$ with respect to a centerline CL that halves the thickness of the plane portion 12$a$. Accordingly, the lower frame portion 12$c$ has a perimetric frame portion 12$c$1 and a jutting portion 12$c$2 that are identical in shape with the perimetric frame portion 12$b$1 and the jutting portion 12$b$2, respectively. However, the jutting portion 12$c$2 is formed at the plane portion 12$a$ in such a manner as to be diagonally opposite the jutting portion 12$b$2 as viewed in plane.

Figure 4:
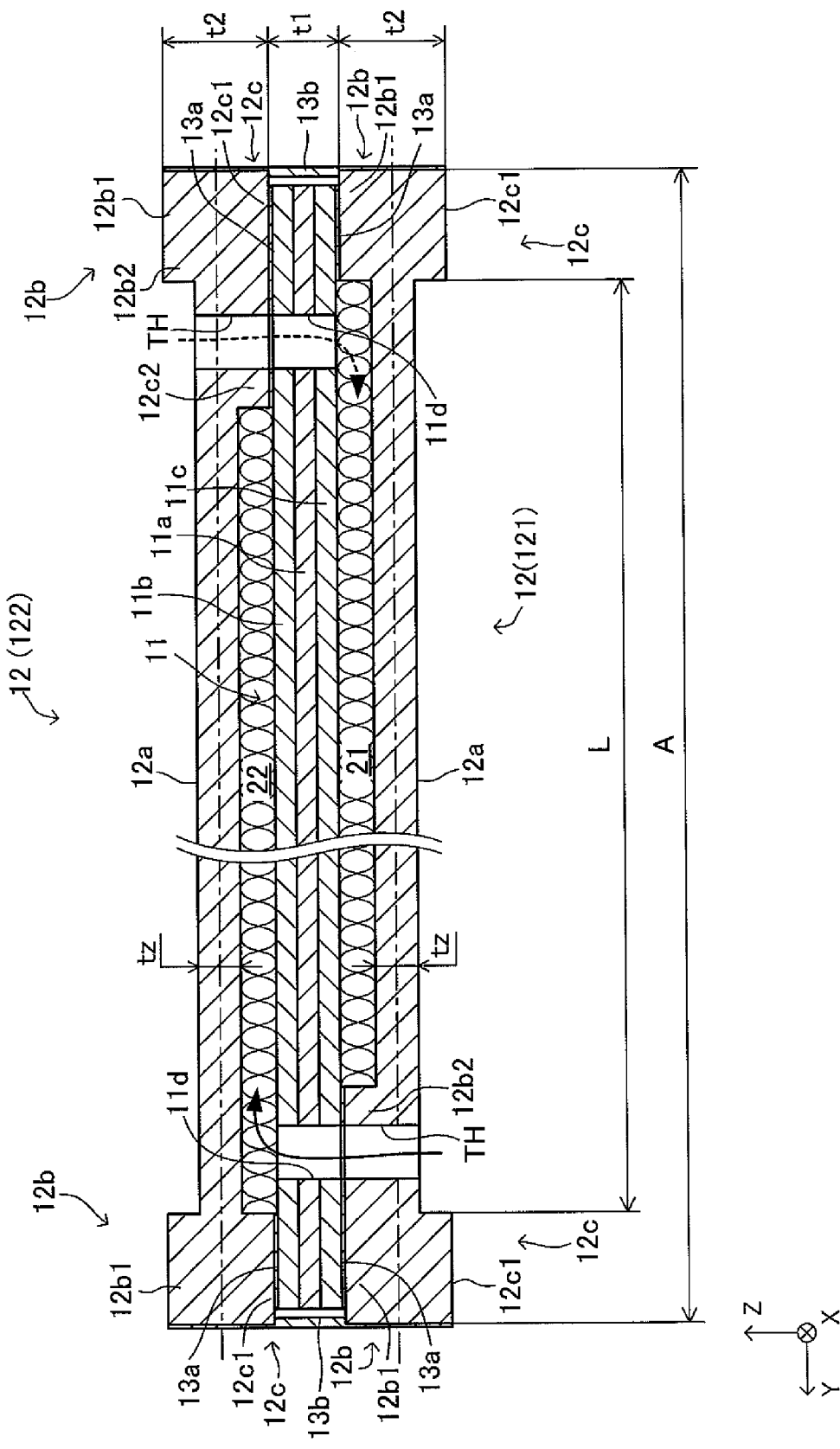
FIG. 4 is a vertical sectional view of the sheet body and the separator, which holds the sheet body, shown in FIG. 1, taken along a plane that includes line 2-2 of FIG. 2 and is in parallel with a y-z plane.

FIG. 4 is a vertical sectional view of the sheet body 11 and a pair of the separators 12 in a state of supporting (holding) the sheet body 11 therebetween, the sectional view being taken along a plane that includes line 2-2 of FIG. 2 parallel with the y-axis and is in parallel with the y-z plane. As described previously, the fuel cell 10 is formed by stacking the sheet bodies 11 and the separators 12 in alternating layers.

For convenience of description, of the paired support members 12, the support member 12 adjacent to the lower side of the sheet body 11 is referred to as a lower support member 121, and the support member 12 adjacent to the upper side of the sheet body 11 is referred to as an upper support member 122. As shown in FIG. 4, the lower support member 121 and the upper support member 122 are coaxially arranged such that the lower frame portion 12$c$ of the upper support member 122 is located above the upper frame portion 12b of the lower support member 121 in a mutually facing manner.

The entire perimetric portion of the sheet body 11 is sandwiched between the upper frame portion 12b (perimetric portion) of the lower support member 121 and the lower frame portion 12c (perimetric portion) of the upper support member 122. At this time, the sheet body 11 is arranged such that the air electrode layer 11c faces the upper surface of the plane portion 12a of the lower support member 121 and such that the fuel electrode layer 11b faces the lower surface of the plane portion 12a of the upper support member 122.

The entire perimetric portion of the sheet body 11, the upper frame portion 12b of the lower separator 121, and the lower frame portion 12c of the upper separator 122 are bonded (sealed) to one another by means of a seal member 13.

The seal member 13 has a first seal portion 13a that bonds (seals) the space (boundary portion) between the upper surface of the perimetric portion of the sheet body 11 and the lower surface of the lower frame portion 12c of the upper separator 122, and the space (boundary portion, first bonding portion) between the lower surface of the perimetric portion of the sheet body 11 and the upper surface of the upper frame portion 12b of the lower separator 121. The seal member 13 also has a second seal portion 13b that bonds (seals) the space (gap, second bonding portion) between the lower side end (lower end of the side face) of the lower frame portion 12c of the upper separator 122 and the upper side end (upper end of the side face) of the upper frame portion 122b of the lower separator 121. The second seal portion 13b is separated from the first seal portion 13a. The second seal portion 13b is continuous over the side face of the fuel cell 10 having the stack structure.

The first seal portion 13a is made of an amorphous glass having a first softening temperature, which is lower than the working temperature (e.g., 600 to 800° C.) of the fuel cell 10. The first seal portion 13a exhibits a function of sealing the first bonding portion. Additionally, when the temperature of the fuel cell 10 (specifically, the temperature of the first seal portion 13a) is less than the first softening temperature, the first seal portion 13a makes the relative movement of the first bonding portion impossible. On the other hand, when the temperature of the fuel cell 10 (specifically, the temperature of the first seal portion 13a) is not less than the first softening temperature, the first seal portion 13a allows the relative movement of the first bonding portion, since the first seal portion 13a is softened. Thus, the internal stress (thermal stress) caused by the difference in the amount of the expansion and contraction between the sheet body 11 and the separator 12 described above can be canceled.

On the other hand, the second seal portion 13b is made of ceramics (specifically, made of a material containing crystalline substance, such as a crystalline glass, glass ceramics, etc., in which amorphous substance and crystalline substance may be mixedly present). The second seal portion 13b exhibits the function of sealing the second bonding portion. Additionally, the second seal portion 13b makes the relative movement of the second bonding portion impossible at all times. Thus, the whole shape of the fuel cell 10 (the shape having the stack structure) can be maintained.

The material having the same composition can be used for the first seal portion 13a having the buffer function of the thermal stress and the second seal portion 13b having the gas seal function. When the material having the different composition is used, decomposition may be produced at the bonding portion due to the thermal history during the operation of the SOFC. When the material having the same composition is used, the decomposition described above can be prevented.

Specifically, the material having the same composition is used for both seal portions 13a and 13b, but the particle size is differed so as to allow the progression degree of the crystallization to be different from each other. Thus, the functions of the first seal portion 13a and the second seal portion 13b are made different. For example, a glass material having a great particle diameter (e.g., about 1 µm) is used for the first seal portion 13a, while a glass material having a small particle diameter (e.g., about not more than 0.3µm) is used for the second seal portion 13b. This structure can produce a difference in the progression degree of the crystallization at the temperature (e.g., 850° C.) upon the heat treatment for the glass bonding during the assembly of the stack. Specifically, in the first seal portion 13a having the great particle diameter, a semicrystalline state is kept in which an amorphous layer is partly left since the crystallization is not completely advanced. On the other hand, the crystallization can be completed in the second seal portion 13b having the small particle diameter. Thus, the buffer function for the thermal stress can be provided to the first seal portion 13a that is in the semicrystalline state, while the gas seal function can be provided to the second seal portion 13b in which the crystallization is completed.

Thus, as shown in FIG. 4, the upper surface of the plane portion 12a of the lower support member 121, the inner wall surface of the upper frame portion 12b (the perimetric frame portion 12b1 and the jutting portion 12b2) of the lower support member 121, and the lower surface of the air electrode layer 11c of the sheet body 11 define an air channel 21 through which a gas containing oxygen (air) flows. The gas containing oxygen flows into the air channel 21 through the through-hole TH of the upper separator 122 and the cell through-hole 11d of the sheet body 11 as indicated by an arrow of a broken line in FIG. 4.

Similarly, the lower surface of the plane portion 12a of the upper support member 122, the inner wall surface of the lower frame portion 12c (the perimetric frame portion 12c1 and the jutting portion 12c2) of the upper support member 122, and the upper surface of the fuel electrode layer 11b of the sheet body 11 define a fuel channel 22 through which a fuel containing hydrogen flows. The fuel flows into the fuel channel 22 through the through-hole TH of the lower separator 121 and the cell through-hole 11d of the sheet body 11 as indicated by an arrow of a solid line in FIG. 4.

As shown in FIG. 4, a metal mesh (e.g., a metal mesh having an emboss structure) for current collection is confined in the air channel 21 and the fuel channel 22. By virtue of this structure, the electrical connection between the lower separator 121 and the sheet body 11 and the electrical connection between the upper separator 122 and the sheet body 11 can be secured. Further, since the metal mesh is confined, the flow channel of a gas is restricted. As a result, the area (circulation area), viewed from the plane, where the electricity-generating reaction can substantially be produced due to the circulation of the gas can be increased in the air channel 21 and the fuel channel 22, whereby the electricity-generating reaction can effectively be generated in the sheet body 11.

Figure 5:
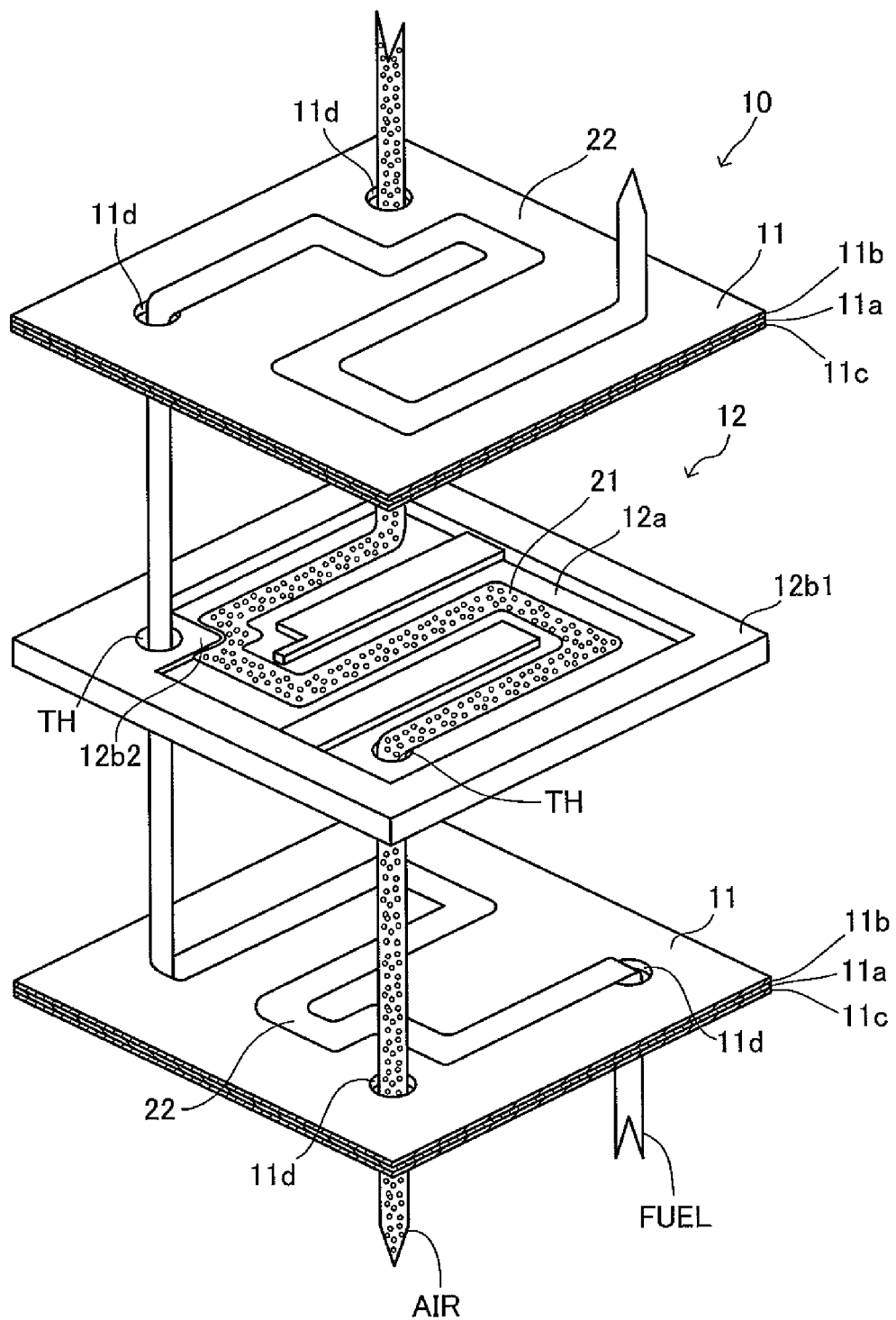
FIG. 5 is a view for explaining a circulation of fuel and air in the fuel cell shown in FIG. 1.

In the thus-configured fuel cell 10, as shown in FIG. 5, the fuel is supplied to the fuel channel 22 formed between the fuel electrode layer 11b of the sheet body 11 and the lower surface of the plane portion 12a of the separator 12, while air is supplied to the air channel 21 formed between the air electrode layer 11c of the sheet body 11 and the upper surface of the plane portion 12a of the separator 12, whereby electricity is generated while utilizing the chemical reactions expressed below by Formulas (1) and (2).

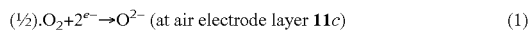

$$(1/2) \cdot O_2 + 2e^- \rightarrow O^{2-} \text{ (at air electrode layer 11}c\text{)} \quad (1)$$

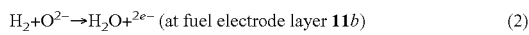

$$H_2 + O^{2-} \rightarrow H_2O + 2e^- \text{ (at fuel electrode layer 11}b\text{)} \quad (2)$$

Since the fuel cell (SOFC) 10 utilizes oxygen conductivity of the solid electrolyte layer 11a for generating electricity, the working temperature of the fuel cell 10 is generally 600° C. or higher. Accordingly, the temperature of the fuel cell 10 is raised from room temperature to the working temperature (e.g., 800° C.) by means of an external heating mechanism (e.g., a heating mechanism that uses a resistance heater or a heating mechanism that utilizes heat generated through combustion of a fuel gas).

Detail of Sheet Body

Figure 6:
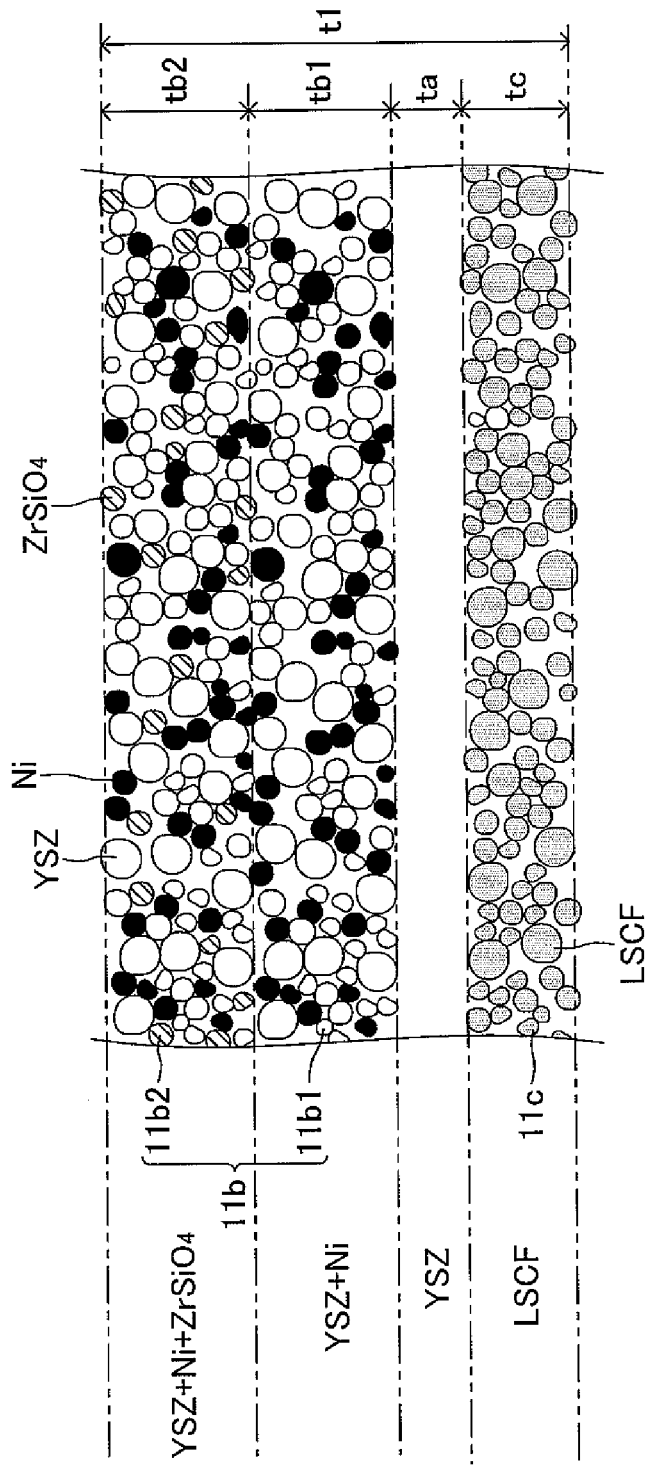
FIG. 6 is a partial side view of the sheet body shown in FIG. 2.

The detail of the sheet body 11 will next be described. As shown in FIG. 6 that is a partial side view of the sheet body 11, the electrolyte layer 11a is a dense layer (single layer) made of fine particles of YSZ. The diameter of each of the YSZ particles contained in the electrolyte layer 11a is within the range of 0.3 to 3 μm in this embodiment. This diameter can be adjusted by the additive amount of $Y_2O_3$ to YSZ or sintering temperature. The air electrode layer 11c is a porous layer (single layer) made of fine particles of LSCF. The diameter of each of the LSCF particles contained in the air electrode layer 11c is within the range of 0.2 to 2 μm in this embodiment.

On the other hand, the fuel electrode layer 11b (after the reduction process) is a porous layer including a first layer 11b1 (positioned at the side close to the electrolyte layer 11b) made of fine particles of Ni and YSZ, and a second layer 11b2 (positioned at the side apart from the electrolyte layer 11a) made of fine particles of Ni, YSZ, and zircon ($ZrSiO_4$). The diameters of each of the Ni particles and YSZ particles contained in the first layer 11b1 are within the range of 0.3 to 1.5 μm and within the range of 0.5 to 2 μm respectively in the present embodiment. The diameters of each of the Ni particles, YSZ particles and $ZrSiO_4$ particles contained in the second layer 11b2 are within the range of 0.3 to 1.5 μm, within the range of 0.5 to 2 μm, and within the range of 0.7 to 2.5 μm respectively in the present embodiment. It is to be noted that the contained amount of the Ni particles (volume %) per unit volume is the same in the first and the second layers 11b1 and 11b2. Specifically, the second layer 11b2 can be said to be the layer obtained by substituting some YSZ particles with zircon particles in the first layer 11b1. Therefore, the amount of contraction by the reduction process is the same in the first and the second layers 11b1 and 11b2.

In particular, in the second layer 11b2, the zircon particles are uniformly distributed (the distribution state of the zircon particles is homogenous) in the plane direction and stacking direction of the sheet body 11 (fuel electrode layer 11b). The state in which "the zircon particles are uniformly distributed in the plane direction (the distribution state of the zircon particles is homogenous)" means that the contained amount of the zircon particles per unit volume is uniform all over the plane direction at any positions in the stacking direction of the second layer 11b2. The state in which "the zircon particles are uniformly distributed in the stacking direction (the distribution state of the zircon particles is homogenous)" means that the contained amount of the zircon particles per unit volume is uniform all over the stacking direction at any positions in the plane direction of the second layer 11b2. Specifically, the contained amount of the zircon particles per unit volume in the second layer 11b2 is uniform therein, and the contained amount thereof is 3 to 30 vol. % in this embodiment.

As described above, the zircon particles are uniformly distributed in the plane direction in the fuel electrode layer 11b. Additionally, since the contained amount of the zircon particles per unit volume in the first layer 11b1 is "0" and the contained amount of the zircon particles per unit volume in the second layer 11b2 is uniform (>0), it can be said that the contained amount of the zircon particles per unit volume is greater in the second layer 11b2 (the side apart from the solid electrolyte layer 11a in the stacking direction) than in the first layer 11b1 (the side close to the solid electrolyte layer 11a in the stacking direction).

The thickness t1 of the sheet body 11 is uniform all over. In the present embodiment, the thickness t1 is 20 μm or more and 50 μm or less. For example, the thickness ta of the electrolyte layer 11a is 0.1 μm or more and 30 μm or less, the thickness tb of the fuel electrode layer 11b is 50 μm or more and 500 μm or less, and the thickness tc of the air electrode layer 11c is 3 μm or more and 50 μm or less. The thickness tb is the sum of the thickness tb1 of the first layer 11b1 and the thickness tb2 of the second layer 11b2 (tb=tb1+tb2). The ratio of tb2 to tb (tb2/tb) is 5 to 80% in the present embodiment.

The room-temperature-to-1000° C. mean thermal expansion coefficients of the electrolyte layer 11a, the air electrode layer 11c, the first layer 11b1, and the second layer 11b2 are 10 to 11.5 ppm/K, 10 to 14 ppm/K, 11.5 to 13.0 ppm/K, and 10.5 to 12 ppm/K, respectively.

Example of Manufacturing Method

Next, an example method for manufacturing the fuel cell 10 will be briefly described. First, the method for manufacturing the sheet body 11 will be described. First, a sheet (a tape of YSZ+NiO+$ZrSiO_4$ that is to become the second layer 11b2) is laminated on the upper surface of a sheet (a tape of YSZ+NiO that is to become the first layer 11b1). A ceramic sheet (a tape of YSZ that is to become the electrolyte layer 11a) manufactured by a green sheet process is laminated on the lower surface of the laminate (that is to become the fuel electrode layer 11a). The ceramic sheet may be formed on the lower surface of the laminate (that is to become the fuel electrode layer 11a) may be formed with a printing process.

Then, the laminate (including the layer that is to become the electrolyte layer 11a and the layer that is to become the fuel electrode layer 11b) is fired at 1400° C. for one hour. A sheet (that is to become the air electrode layer 11c) is formed on the lower surface of the fired body with a printing process, and the resultant sheet is fired at 850° C. for one hour. Thus, the sheet body 11 including the electrolyte layer 11a, the fuel electrode layer 11b (the first layer 11b1+the second layer 11b2), and the air electrode layer 11c is manufactured.

The separator 12 can be formed by etching or cutting.

Next, the glass material (borosilicate glass) constituting the first seal portion 13a is applied by a printing process to the portions (i.e., the lower surface of the lower frame member 12c, and the upper surface of the upper frame portion 12b) that hold the sheet body 11 at the perimetric portion of each separator 12. Then, the separators 12 and the sheet bodies 11 are stacked in alternating layers, followed by heat treatment (830° C. for one hour) for integration of the layers into a stack structure. Subsequently, a material (borosilicate-base crystallized glass or the like) constituting the second seal portion 13b is applied to the perimetric portion of the stack structure, followed by heat treatment (e.g., 850° C. for one hour) for reinforcement. The fuel cell 10 is thus completed.

The materials having the same composition but whose grain diameters are different (the diameter at the side of the first seal portion 13a is great, while the diameter at the side of the second seal portion 13b is small) may be used as the materials constituting the first and the second seal portions 13a and 13b. In this case, the degree of the progression of the crystallization is different between the first and the second seal portions 13a and 13b upon the heat treatment. By utilizing this performance, the integration of the layers into a stack structure by the first seal portion 13a and the reinforcement of the stack structure by the second seal portion 13b can be achieved only by one heat treatment with the materials constituting the first and the second seal portions 13a and 13b applied.

Operation and Effect

The operation and effect obtained by the structure in which the fuel electrode layer 11b includes the first and the second layers 11b1 and 11b2 will be described below.

Figure 7:
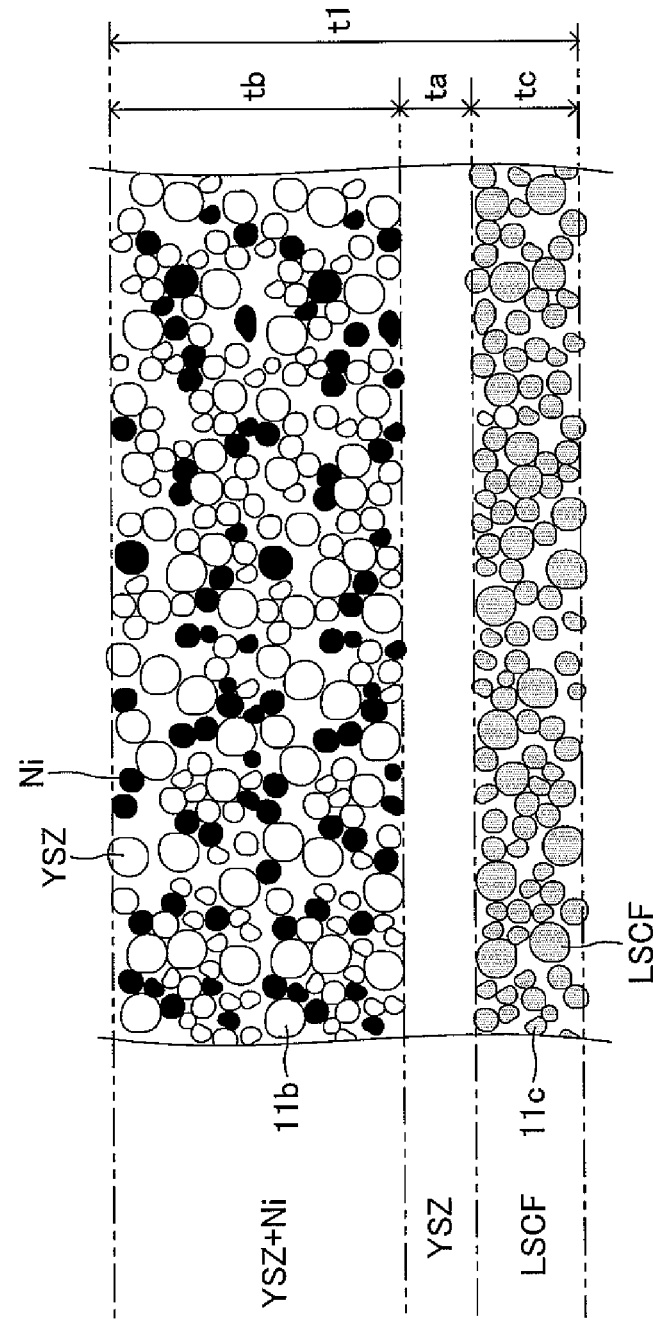
FIG. 7 is a partial side view of a sheet body in a comparative example.

Firstly, the effect of reducing the warped amount of the sheet body will be described. As shown in FIG. 7, a sheet body is considered that can be obtained by replacing the second layer 11b2 in the fuel electrode layer 11b in the embodiment shown in FIG. 6 with a layer having the composition same as that of the first layer 11b1. Specifically, the fuel electrode layer 11b in the sheet body shown in FIG. 7 includes a single layer made of fine particles of Ni and YSZ, wherein the thickness tb of the single layer is equal to the sum of the thickness of the first layer and the thickness of the second layer 11b2 (=tb1+tb2) in the embodiment described above.

In the sheet body shown in FIG. 7, the thermal expansion coefficient of the fuel electrode layer 11b is greater than the thermal expansion coefficient of the electrolyte layer 11a. Therefore, the sheet body is likely to deform in the direction in which the air electrode layer 11c projects (in the direction in which the lower side projects) due to the internal stress (thermal stress) caused by the difference in the thermal expansion coefficient between the layers and due to the internal stress (thermal stress) caused by the difference in the amount of expansion and contraction between the layers during the firing.

On the other hand, in the embodiment shown in FIG. 6, the zircon particles are contained in the area of the second layer 11b2 in the fuel electrode layer 11b. The zircon has an extremely small expansion coefficient compared to YSZ. Therefore, since the zircon particles are contained in the fuel electrode layer 11b, the mean thermal expansion coefficient of the fuel electrode layer 11b is reduced. As a result, the mean thermal expansion coefficient of the fuel electrode layer 11b can be made close to the thermal expansion coefficient of the electrolyte layer 11a, compared to the embodiment shown in FIG. 7.

Further, the contained amount of the zircon particles per unit volume in the fuel electrode layer 11b is greater at the side apart from the electrolyte layer 11a (in the second layer 11b2) than at the side close to the electrolyte layer 11a (in the first layer 11b1) in the embodiment shown in FIG. 6. In other words, the local thermal expansion coefficient in the fuel electrode layer 11b is smaller at the side apart from the electrolyte layer 11a than at the side close to the electrolyte layer 11a. Accordingly, in the single body of the fuel electrode layer 11b, the internal stress (thermal stress) is generated in the direction in which the side apart from the electrolyte layer 11a (the side of the second layer 11b2) projects (in the direction in which the upper side projects).

From the two effects described above, the warpage of the sheet body (the warpage in the direction in which the lower side projects) can be suppressed in the above-mentioned embodiment shown in FIG. 6, compared to the sheet body shown in FIG. 7. In the embodiment shown in FIG. 6, the thermal expansion coefficient of the air electrode layer 11c is generally equal to (or slightly greater than) the thermal expansion coefficient of the electrolyte layer 11a. However, in this embodiment, the thickness of the air electrode layer 11c is extremely smaller than the thickness of the fuel electrode layer 11b, so that the affect caused by the magnitude of the thermal expansion coefficient of the air electrode layer 11c to the warpage of the sheet body is very small.

The experiment conducted for confirming the operation and effect described above will be described below. In this experiment, plural sheet bodies corresponding to the embodiment shown in FIG. 6, each having layers of different thickness, and plural sheet bodies corresponding to the embodiment shown in FIG. 7, each having layers of different thickness, were prepared by utilizing the manufacturing method described above. The planar shape of each of the sheet bodies was a square having one side of 30 mm (A'=30 mm). The warped amount was measured by means of a laser-type non-contact shape measuring device at room temperature for each of the manufactured sheet bodies. The height from a plane to the uppermost point at the center of the sheet body was employed as the warped amount, when the sheet body was placed on the plane table with the direction in which the center of the sheet body was deformed upwardly. The results of the measurement were shown in Table 1. In Table 1, the sheet bodies including the second layer (in which the thickness of the second layer was tb2>0) correspond to the embodiment shown in FIG. 6, while the sheet bodies not including the second layer correspond to the embodiment shown in FIG. 7.

TABLE 1

| | Thickness (μm) | | | | | |
|---|---|---|---|---|---|---|
| Standard | Electrolyte layer ta | Air electrode layer tc | Fuel electrode layer (first layer) tb1 | Fuel electrode layer (second layer) tb2 | Overall of sheet body t1 | Measured value Warped amount (μm) |
| 1 | 3 | 15 | 150 | — | 168 | 350 |
| 2 | 3 | 15 | 130 | 20 | 168 | 55 |
| 3 | 3 | 15 | 110 | 40 | 168 | 18 |
| 4 | 2 | 15 | 150 | — | 167 | 223 |
| 5 | 2 | 15 | 130 | 20 | 167 | 35 |
| 6 | 2 | 15 | 110 | 40 | 167 | 8 |
| 7 | 3 | 10 | 150 | — | 163 | 333 |
| 8 | 3 | 10 | 130 | 20 | 163 | 62 |
| 9 | 3 | 10 | 110 | 40 | 163 | 22 |
| 10 | 3 | 15 | 120 | — | 138 | 630 |
| 11 | 3 | 15 | 100 | 20 | 138 | 80 |
| 12 | 3 | 15 | 90 | 30 | 138 | 32 |

As shown in Table 1, it can be understood that the warped amount of the sheet body shown in FIG. 6 is apparently smaller than the warped amount of the sheet body shown in FIG. 7.

Figure 8:
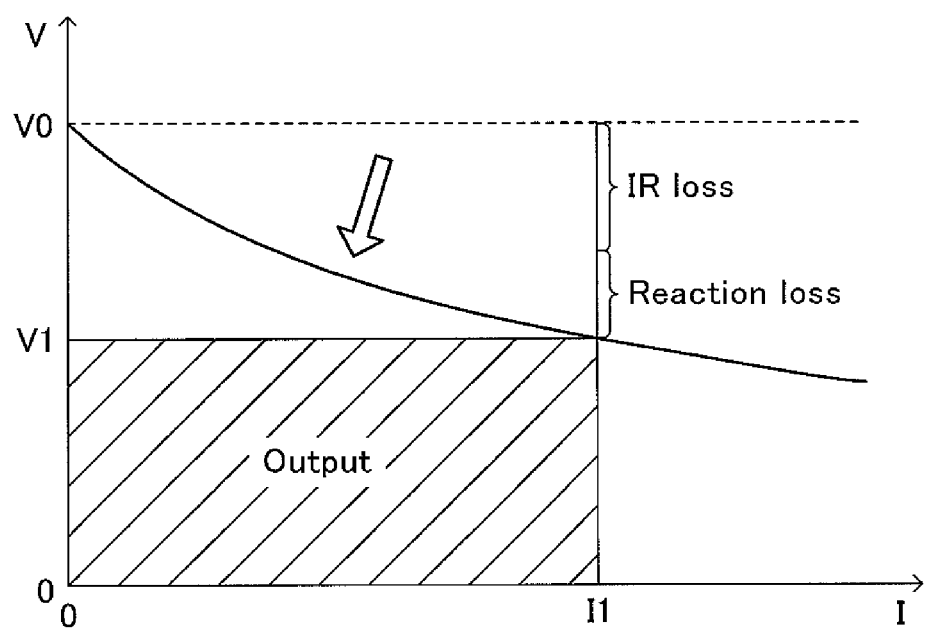
FIG. 8 is a view for explaining IR loss and reaction loss.

Next, the effect of suppressing the increase in the electrical resistance in the fuel electrode layer will be described. Firstly, the electrical resistance in the stacking direction will be described. In the above-mentioned sheet body, electric resistance generated when current (specifically, electrons $e^-$, oxygen ions $O^{2-}$) flows in the stacking direction and reaction resistance in the fuel electrode layer and the air electrode layer due to the electricity generating reaction are inevitably present. By virtue of the presence of the electric resistance and reaction resistance, the output voltage V of the sheet body is lowered from the theoretical electromotive force V0 according to the increase in the current I flowing through the sheet body as shown in FIG. 8. Here, the amount of reduced voltage caused by the electric resistance of the sheet body is referred to as "IR loss", and the amount of reduced voltage caused by the reaction resistance of the sheet body is referred to as "reaction loss".

The output of the sheet body can be expressed by the area of the region indicated by a hatched line in FIG. 8. For example, when the current I=I1, the output of the sheet body becomes "I1·V1". Accordingly, the output of the sheet body (accordingly, the output of the SOFC) can be increased by reducing the IR loss and the reaction loss.

The IR loss (electrical resistance) of the sheet body is composed of the IR loss of the electrolyte layer 11a caused by the electrical resistance when oxygen ions $O^{2-}$ pass through the electrolyte layer 11a in the stacking direction, the IR loss of the fuel electrode layer 11b caused by the electrical resistance when electrons $e^-$ pass through the fuel electrode layer 11b in the stacking direction, the IR loss of the air electrode layer 11c caused by the electrical resistance when electrons $e^-$ pass through the air electrode layer 11c in the stacking direction, and the IR loss at the interface portions between the layers. If the IR loss of the electrolyte layer 11a can be decreased, the output of the sheet body 11 (accordingly, the output of the fuel cell 10) can be increased.

Figure 9:
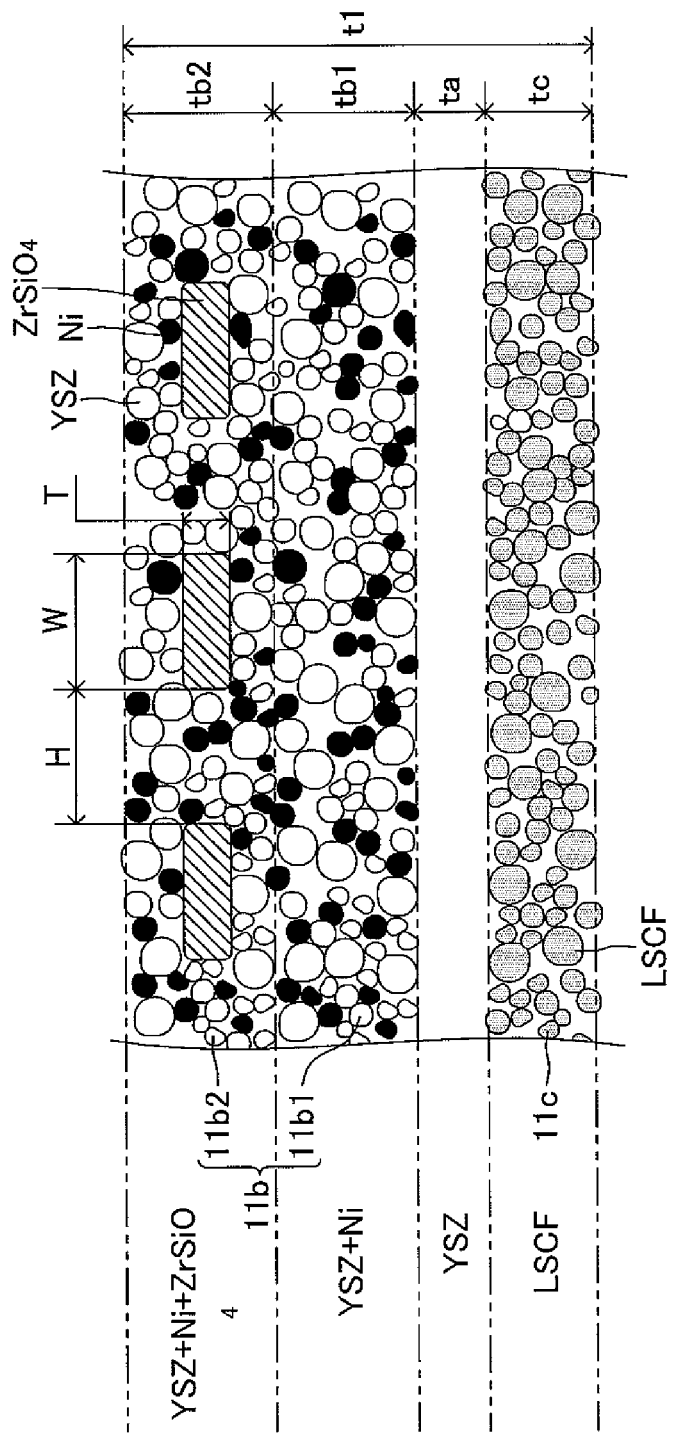
FIG. 9 is a partial side view of a sheet body according to another comparative example.

Here, a sheet body shown in FIG. 9 is considered, in which the distribution of the zircon particles in the second layer 11b2 is changed to form a zircon layer, which is formed by densely collecting the zircon particles in the second layer 11b2, the zircon layer being embedded in a matrix as viewed in a plane (the thickness of the zircon layer=T, the width of the matrix corresponding to the zircon layer viewed in a plane=W, the space between the matrixes=H). The zircon is an insulator. Therefore, when the zircon particles are non-uniformly distributed in the plane direction of the fuel electrode layer 11b, the IR loss in the stacking direction caused by the presence of the zircon is extremely increased for the area (the area where the zircon layer is embedded) where the zircon particles are densely collected.

On the other hand, in the embodiment shown in FIG. 6, the zircon particles are uniformly distributed in the plane direction in the second layer 11b2. Therefore, the area where the IR loss in the stacking direction is extremely increased due to the presence of the zircon is not produced. As a result, the mean increase in the IR loss (electrical resistance) of the entire fuel electrode layer 11b in the stacking direction can be suppressed. Consequently, the decrease in the output of the fuel cell 10 caused by the formation of the second layer 11b2 containing the zircon particles can be prevented.

The experiment conducted for confirming the operation and effect described above will be described below. In this experiment, plural sheet bodies corresponding to the embodiment shown in FIG. 6, each having layers of different thickness, and plural sheet bodies corresponding to the embodiment shown in FIG. 9, each having layers of different thickness, were prepared by utilizing the manufacturing method described above. In the sheet body shown in FIG. 9, the zircon layer was formed and embedded by printing when the fuel electrode layer was laminated. The planar shape of each of the sheet bodies was a square having one side of 30 mm (A'=30 mm). The output densities of the sheet bodies were measured under the fixed condition, which was the working temperature of 700° C. and the voltage of 0.7 V, for the manufactured sheet bodies. During the measurement, hydrogen gas and air gas were sufficiently fed, so that the gas utilizations of the hydrogen gas and the air gas were not more than 10% respectively. Table 2 shows the result of the measurement. In Table 2, the sheet bodies having the second layer correspond to the embodiment shown in FIG. 6, while the sheet bodies having the zircon layer correspond to the embodiment shown in FIG. 9.

TABLE 2

| | Thickness (μm) | | | | | Measured value Output density (mW/cm²) |
|---|---|---|---|---|---|---|
| Standard | Electrolyte layer ta | Air electrode layer tc | (Overall) tb | (Second layer) tb2 | (Zircon layer) W, H, T | |
| 1 | 3 | 15 | 150 | 40 | — | 1800 |
| 2 | 3 | 15 | 150 | — | 500, 500, 30 | 230 |
| 3 | 3 | 15 | 150 | — | 200, 500, 30 | 330 |
| 4 | 3 | 15 | 150 | — | 150, 500, 30 | 400 |
| 5 | 3 | 15 | 150 | — | 150, 1000, 30 | 620 |
| 6 | 3 | 15 | 150 | — | 100, 1000, 30 | 730 |

As shown in Table 2, it can be understood that the output density of the sheet body according to the embodiment shown in FIG. 6 is greater than that of the sheet body shown in FIG. 9. This means that, in the embodiment shown in FIG. 6, the amount of the decrease in the output density of the sheet body caused by the formation of the second layer 11b2 containing the zircon particles is small, i.e., the amount of the increase in the IR loss (electrical resistance) in the stacking direction caused by the presence of the zircon is small, compared to the sheet body shown in FIG. 9.

The mean thermal expansion coefficient of the fuel electrode layer is also decreased due to the embedded zircon layer in the sheet body shown in FIG. 9, whereby the mean thermal expansion coefficient of the fuel electrode layer can be made close to the thermal expansion coefficient of the electrolyte layer. As a result, it was confirmed that the warpage (the warpage in the direction in which the lower side projected) of the sheet body caused by the difference in the thermal expansion coefficient between the layers could be prevented. However, it was confirmed that the greater the ratio of the area of the planar shape of the zircon layer (shape of the matrix) to the area of the planar shape of the overall fuel electrode layer was (i.e., the greater the width W of the matrix was, and the smaller the space H between the matrixes was), the greater the amount of the decrease in the output density of the sheet body was (i.e., the amount of the increase in the IR loss in the stacking direction caused by the presence of the zircon was). It was also confirmed that, since the portion where the zircon layer was embedded (i.e., the portion where the thermal expansion coefficient was extremely small) was present in the fuel electrode layer, the problem of cracks produced in the fuel electrode layer was likely to occur during the manufacture of the SOFC or during the use of the SOFC.

As explained above, in the solid oxide fuel cell (SOFC) 10 having a flat-plate structure according to the embodiment of the present invention, the fuel electrode layer 11b of the sheet body 11 includes two layers that are the first layer 11b1 (the side close to the electrolyte layer 11a) and the second layer 11b2 (the side apart from the electrolyte layer 11a), wherein the second layer 11b2 contains zircon particles that are uniformly distributed. Thus, the extremely thin sheet body for a single cell of the SOFC can be provided in which the warpage of the sheet body can be prevented, and the increase in the electrical resistance of the fuel electrode layer can also be suppressed.

The other effects obtained by containing the zircon into the second layer 11b2 will be described below.
1. The zircon has a property of not reacting with NiO and YSZ. Therefore, the alteration of NiO and YSZ in the fuel electrode layer 11b can be prevented.
2. The Young's modulus of the zircon is extremely great such as about 300 GPa. Therefore, the rigidity of the fuel electrode layer serving as the support layer of the sheet body can be increased, which is advantageous in making the sheet body flat and thin.

3. As described above, it is necessary to perform a predetermined reduction process to the fuel electrode layer to change the NiO in the fuel electrode layer 11b to Ni in order to make the fuel electrode layer serve as a fuel electrode. The zircon can contribute to the maintenance of the shape of the fuel electrode layer 11b upon the reduction process. Specifically, the fuel electrode layer 11b contracts because the NiO changes to Ni due to the reduction process. When the sheet body is extremely thin, the sheet body warps because of the contraction of the fuel electrode layer 11b. When the fuel electrode layer 11b contains zircon, the warpage of the sheet body can be prevented.

4. During when the SOFC is used, the grain growth (sintering) of the Ni in the fuel electrode layer 11b may be produced. The conduction path (specifically, the path through which electrons pass) connected and formed due to the contact of Ni particles in the fuel electrode layer 11b changes, whereby the conductivity of the fuel electrode layer 11b is generally lowered. When the fuel electrode layer 11b contains zircon, the grain growth can be prevented. Specifically, the reduction in the conductivity of the fuel electrode layer 11b caused by the grain growth can be prevented.

5. The zircon itself does not become a poisoning source of the fuel electrode layer 11b during when the SOFC is used.

The present invention is not limited to the above-described embodiment, but can be modified in various other forms without departing from the scope of the present invention. For example, in the above-mentioned embodiment, the fuel electrode layer 11b includes two layers that are the first layer 11b1 not containing zircon and the second layer 11b2 containing zircon. However, it may be configured such that the fuel electrode layer 11b includes plural layers (i.e., not less than three layers) that are the layer not containing zircon (the layer closest to the electrolyte layer 11a) and two or more layers in which the zircon particles are uniformly distributed in the plane direction and in the stacking direction in each layer and the contained amount of the zircon particles per unit volume is increased toward the layer apart from the electrolyte layer 11a. The fuel electrode layer 11b may include only the plural layers, i.e., two or more layers, in which the zircon particles are uniformly distributed in the plane direction and in the stacking direction in each layer and the contained amount of the zircon particles per unit volume is increased toward the layer apart from the electrolyte layer 11a. The fuel electrode layer 11b may also be configured such that the zircon particles are uniformly distributed in the plane direction, and the contained amount of the zircon particles per unit volume is gradually increased toward the side apart from the electrolyte layer 11a (i.e., continuous layer). Further, the fuel electrode layer 11b may be configured such that the zircon particles are uniformly distributed in the plane direction and in the stacking direction (i.e., the contained amount of zircon particles per unit volume is fixed all over the fuel electrode layer 11b).

In the above-described embodiment, the portion of the electrode layer 11b (first and second layers 11b1, 11b2) other than zircon can be formed from, for example, platinum, platinum-zirconia cermet, platinum-cerium-oxide cermet, ruthenium, or ruthenium-zirconia cermet.

Also, the air electrode layer 11c can be formed from, for example, lanthanum-containing perovskite-type complex oxide (e.g., lanthanum manganite, lanthanum cobaltite, or lanthanum ferrite, in addition to the above-mentioned lanthanum strontium cobalt ferrite). Lanthanum cobaltite, lanthanum manganite and lanthanum ferrite may be doped with strontium, calcium, chromium, cobalt, iron, nickel, aluminum, or the like. Also, the air electrode layer 11c may be formed from palladium, platinum, ruthenium, platinum-zirconia cermet, palladium-zirconia cermet, ruthenium-zirconia cermet, platinum-cerium-oxide cermet, palladium-cerium-oxide cermet, or ruthenium-cerium-oxide cermet.

In the above-mentioned embodiment, the sheet body 11 and the separator 12 have a planar shape of square. However, the sheet body 11 and the separator 12 may have a planar shape of rectangle, circle, ellipse, etc.

What is claimed is:

1. A sheet body for a solid oxide fuel cell comprising;
a solid electrolyte layer;
a fuel electrode layer formed on an upper surface of the solid electrolyte layer and receiving a supply of a fuel gas from the upper surface of the fuel electrode layer;
and an air electrode layer formed on a lower surface of the solid electrolyte layer and receiving a supply of a gas containing oxygen from the lower surface of the air electrode layer;
wherein the solid electrolyte, fuel electrode, and air electrode layers are stacked and fired;
wherein the fuel electrode layer is a fired body including at least particles of a first material for allowing an oxygen ion to pass, particles of a second material for allowing an electron to pass, and zircon particles, wherein the zircon particles are uniformly distributed in the plane direction of the fuel electrode layer;
wherein the fuel electrode layer is a laminate of a continuous first layer formed on the upper surface of the solid electrolyte layer and composed of the particles of the first and second materials, and a continuous second layer formed on and covering an entirety of the upper surface of the first layer and composed of the particles of the first and second materials and the zircon particles, wherein the zircon particles are uniformly distributed in the plane direction and the stacking direction, and wherein a diameter of the particles of the first material contained in the second layer is within a range of 0.3 to 1.5 μm, a diameter of the particles of the second material contained in the second layer is within a range of 0.5 to 2 μm, and a diameter of the zircon particles contained in the second layer is within a range of 0.7 to 2.5 μm; and
wherein a thickness of the solid electrolyte layer is within a range of 0.1 to 30 μm, a thickness of the fuel electrode layer is within a range of 50 to 500 μm, and the thickness of the air electrode layer is within the range of 3 to 50 μm.

2. The sheet body for a solid oxide fuel cell according to claim 1, wherein a ratio of the thickness of the second layer to the thickness of the fuel electrode layer is 5 to 80%.

3. The sheet body for a solid oxide fuel cell according to claim 1, wherein a thermal expansion coefficient of the solid electrolyte layer is within a range of 10 to 11.5 ppm/K, a thermal expansion coefficient of the air electrode layer is within a range of 10 to 14 ppm/K, the thermal expansion coefficient of the first layer is within a range of 11.5 to 13.0 ppm/K, and a thermal expansion coefficient of the second layer is within a range of 10.5 to 12 ppm/K.

4. The sheet body for a solid oxide fuel cell according to claim 1, wherein the amount of the zircon particles per unit volume in the second layer is 3 to 30 vol. %.

5. A solid oxide fuel cell comprising:
one or more sheet bodies according to claim 1; and
a plurality of support members that support the one or more sheet bodies;

wherein the sheet bodies and the support members are alternately stacked; and wherein for each sheet body, a channel of a fuel gas, which is a fuel channel, is defined between the sheet body and the support member formed above the sheet body so as to be adjacent to the sheet body, while a channel of a gas containing oxygen, which is an air channel, is defined between the sheet body and the support member formed below the sheet body so as to be adjacent to the sheet body.

* * * * *